3,032,541
POLYMERS AND PREPARATION THEREOF

Louis A. Errede, Westfield, and Billy F. Landrum and Horace R. Davis, Cedar Grove, N.J., assignors, by mesne assignments, to Minnesota Mining and Manufacturing Company, St. Paul, Minn., a corporation of Delaware
No Drawing. Filed Apr. 30, 1956, Ser. No. 581,297
23 Claims. (Cl. 260—88.3)

This invention relates to a novel and useful polymeric composition of improved properties and to a method for the preparation thereof. In one aspect this invention relates to a novel and useful plastic containing aromatically unsaturated nuclei and having improved molding properties. In another aspect this invention relates to a novel process for the preparation of novel and improved polymers containing recurring aromatically unsaturated nuclei. In still another aspect this invention relates to the production of a novel and valuable high molecular weight oxy-nitrogen containing, aromatically unsaturated polymer which is useful as a plasticizer.

It is known that polymers which contain aromatically unsaturated nuclei such as poly-1,4-xylylene have desirable properties which make them valuable as electrical insulators and as protective coatings which have high heat stability, extra-ordinary resistance to attack by corrosive liquids and excellent non-permeability to common organic solvents. However, in spite of these desirable characteristics, such polymers have been confined to somewhat limited application as a result of certain less desirable properties such as their non-flexibility and the difficulty in molding them except at a very high temperature ranging between about 350° C. and about 450° C.

In is an object of the present invention to provide new and valuable polymers of improved properties.

Another object of this invention is to provide a new and valuable polymer which can be applied to surfaces as a protective coating.

Another object is to provide a novel polymer which can be employed as a plasticizer.

Another object of this invention is to provide new and valuable thermoplastics containing recurring aromatically unsaturated nuclei and which can be molded at a relatively low temperature into a variety of useful articles possessing good heat stability and electrical properties.

Another object is to provide a commercially feasible and economical process for the preparation of polymers containing recurring aromatic nuclei and have the above-mentioned desirable characteristics.

A further object is to provide a method for the preparation of novel thermoplastic material of improved properties which process is characterized by the maximum utilization of the starting materials and the minimum formation of undesirable by-products.

Various other objects and advantages of the present invention will become apparent to those skilled in the art from the accompanying description and disclosure.

According to this invention a quinodimethane is reacted with an inorganic oxy-nitrogen compound under conditions such that an oxy-nitrogen-containing aromatically unsaturated compound is produced as a product of the process. The novel product so produced comprises a plurality of aromatically unsaturated units having as a terminal group an oxy-nitrogen radical.

The quinodimethanes which are reacted as described herein include 1,4-quinodimethane, 1,4-naphthaquinodimethane, and corresponding heterocyclic quinodimethanes containing at least one heteronitrogen atom vicinal only to carbon atoms, and the nuclear substitution products of the foregoing members with atoms of the normally gaseous halogen atoms and methyl and halomethyl groups.

Of the various inorganic oxy-nitrogen compounds which may be used as coreactants or addition agents in the process of this invention, nitric oxide (NO), nitrous peroxide ($N_2O_2$), nitrogen dioxide ($NO_2$) and nitrogen tetroxide ($N_2O_4$) are examples.

The process of this invention is effected by interacting the quinodimethane and the oxy-nitrogen compound in a liquid medium at a temperature below 30° C. When the inorganic oxy-nitrogen compound is interacted with a quinodimethane, a polymerization reaction ensues leading to the production of a polymer which contains recurring xylylene units and is terminally bonded to at least one oxy-nitrogen group through the carbon atom of the methylene group of said xylylene unit, the aromatic nucleus of each xylylene unit having the same cyclic skeleton as the quinodimethane starting material. The physical nature of the organic oxy-nitrogen-containing products of this invention ranges from low molecular weight materials such as low melting solids and greases to higher molecular weight thermoplastics.

The quinodimethanes used in accordance with the present invention contain from 1 to 2 six-membered rings, one of said rings being diunsaturated and having each of two carbon atoms of the cyclic skeleton bonded to a carbon atom of an aliphatic group through a double bond. This latter type ring which is common to each of the quinodimethanes used as a monomer in the process of this invention is referred to herein as the quinoid ring. Although the two aliphatic groups which are doubly bonded to the diunsaturated or quinoid ring may be bonded to adjacent, i.e. ortho-positioned, carbon atoms of the ring they are preferably bonded to carbon atoms of the ring which are in the para or 1,4-position to one another. The preferred quinodimethanes of this invention are those having a symmetrically diunsaturated six-membered ring to which a methylene group is doubly bonded to each of two para-positioned carbon atoms, such as, for example, in p-quinodimethane which has the structure,

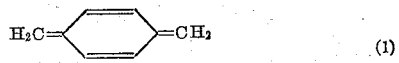
(1)

As indicated above, the term quinodimethane as used herein also includes those compounds having a quinoid ring fused to one or more aromatically unsaturated six-membered rings such as, for example, in 1,4-naphthaquinodimethane which has the structure:

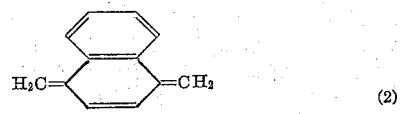
(2)

The aromatically unsaturated ring which is fused to the quinoid ring is referred to herein as the benzenoid ring.

It is to be understood that the quinodimethane starting material of this invention may be a carbocyclic compound, i.e. a cyclic compound in which each atom of the cyclic skeleton is a carbon atom such as in p-quinodimethane and 1,4-naphthaquinodimethane; or it may be a nitrogen-containing heterocyclic compound, i.e. a compound having at least one nitrogen atom as part of the cyclic skeleton. The heterocyclic compounds are preferably those in which the nitrogen is vicinal only to carbon and includes those in which nitrogen is a constituent of the quinoid ring or the benzenoid ring.

The groups which are singly bonded to the cyclic skeleton of the quinodimethane are referred to herein as the nuclear substituents and are hydrogen, normally gaseous halogens and methyl and halomethyl radicals. These substituents of the dicyclic compounds may be on the quinoid ring or on the aromatically unsaturated ring or on both rings. When more than one halogen is present, they may be either the same halogens or different halogens. Of the quinodimethanes which are substituted with methyl or halogen groups, those having not more than two methyl groups or two halogens are preferred. The methylene groups which are doubly bonded to the quinoid ring may be substituted with aryl radicals, normally gaseous halogens, and lower alkyl groups such as methyl groups, without departing from the scope of this invention.

As an example, the quinodimethane starting material which is reacted in accordance with the present invention is prepared by pyrolyzing an aromatic compound of the group consisting of p-xylene, 1,4-dimethyl naphthalene, corresponding heterocyclic dimethyl compounds having from 1 to 2 six-membered rings and containing at least one heteronitrogen which is vicinal only to carbon atoms, and the nuclear substitution products of the foregoing members with atoms of the normally gaseous halogens and additional methyl radicals at a temperature between about 700° C. and 1300° C. and a total pressure not higher than about 400 mm. mercury for a period of not more than one second followed by quenching of the pyrolyzed vapors to a temperature which is preferably below −45° C., preferably in a cold liquid or on a cold metal surface.

The pyrolysis of the aforesaid 1,4-dimethyl substituted aromatic compounds is preferably carried out at a temperature within the range of between about 900° C. and about 1300° C., for example, at about 1000° C. For best results the aromatic vapor should be present at a vapor pressure substantially not higher than 150 mm. mercury. Excellent results are obtained when the vapor pressure of the 1,4-dimethyl substituted aromatic compound is 10 mm. mercury or somewhat below, for example, about 5 mm. mercury. The pyrolysis can be conducted in the presence of an inert gas, such as carbon dioxide, steam or nitrogen, particularly when the partial pressure of the aromatic compound is 10 mm. mercury or below. In all cases the total pressure employed should be below 400 mm. mercury. Within the preferred pyrolysis temperature range the residence time should be within the range of from about 0.5 to about 0.001 second, however, a shorter or longer residence time can be used without departing from the scope of this invention.

The quinodimethanes thus formed tend to homopolymerize very quickly when in the vapor phase or in solution at a temperature above −45° C. in the absence or in the presence of an initiator such as, for example, acetyl peroxide. It has been found that in the absence of a polymerization initiator the quinodimethanes do not homopolymerize rapidly at a temperature below −45° C. The hot vapor of quinodimethane produced by the above pyrolysis reaction is quenched rapidly, therefore, in a liquid, for example, hexane which is maintained at a relatively low temperature; preferably below −45° C. The temperature at which the hot vapors are quenched depends on whether or not the quinomethane thereby produced is to be stored over an extended period of time or whether the quinodimethane is to be used immediately as a monomer in accordance with the process of this invention. This is an important consideration since as indicated above, it has been found that the quinodimethanes form homopolymeric products at about room temperature; and, in fact, they homopolymerize rapidly at temperatures above −45° C. Thus, when it is desired to store the quinodimethane in stable form until it is to be interacted with an inorganic oxy-nitrogen compound as described herein, the hot vapor obtained by the pyrolysis reaction is quickly quenched and dissolved in a cold liquid maintained at a temperature below −45° C. and preferably at about −80° C. or below. The resulting solution thus prepared is stored under nitrogen until ready for use.

The liquid used for quenching and storing of the quinodimethane may be of any composition which remains liquid at the necessary temperature range and which has a relatively low partial pressure at about −45° C. consistent with the upper total pressure limit of 400 mm. mercury pressure and preferably low enough to permit operation below 10 mm. mercury pressure. The liquid also should be substantially non-reactive with the quinodimethane formed and with the oxide of nitrogen, although liquids which do not form products which are detrimental to the reaction and which do not consume significant amounts of the reactants may be used.

Among the specific liquids which may be used for quenching are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloro-ethyl benzene, o-fluoro toluene and 1,1-dichloroethane; a carbonyl compound of low freezing point such as acetone, methyl ethyl ketone and methyl isobutyl ketone; an ether of low freezing point, such as diethyl ether, ethyl n-propyl ether and tetrahydrofurane; an alcohol of low freezing point, such as methanol, ethanol and isopropyl alcohol; and other normally liquid compounds of low freezing point, such as carbon disulfide. If desired, a liquid of low freezing point may be obtained by the blending of two or more compounds of higher freezing point. For example, a mixture of carbon tetrachloride and chloroform can be used.

Among the specific carboxylic aromatic compounds which can be pyrolyzed to produce the aforesaid quinodimethanes which are used as a reactant in accordance with the process of this invention are: p-xylene; pseudocumene; durene; isodurene; prehnitene; pentamethyl benzene, hexamethyl benzene; 1,4-dimethyl naphthalene; 1,2,3,4,6,7-hexamethyl naphthalene; 2-chloro-p-xylene; 2-chloro-methyl-p-xylene; 2-fluoro-p-xylene; 2,5-difluoro-xylene; 2,5-dichloro-p-xylene; 2,3,5-trichloro-p-xylene; 2,3,5-trifluoro-p-xylene; 2,3,5,6-tetrachloro-p-xylene; 2,3,5,6-tetrafluoro-p-xylene; 2-chloro-3,5,6-trimethyl benzene; 6-chloro-1,4-dimethyl naphthalene; and 2,3,6,7-tetrachloro-1,4-dimethyl naphthalene. Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline; and 2,5-dimethyl-6-chloropyrazine.

A more detailed description concerning the preparation of the quinodimethane starting material used in accordance with the present invention can be found in our prior copending application, Serial No. 386,106 filed on October 14, 1953, now U.S. Patent 2,777,005, patented Jan. 8, 1957.

The addition agent or coreactant employed in the polymerization reaction of this invention with quinodimethane is an inorganic oxy-nitrogen compound, more specifically an inorganic, non-acidic, oxy-nitrogen compound, such as an oxide of nitrogen, for example, nitric oxide (NO), nitrogen dioxide ($NO_2$), nitrous peroxide ($N_2O_2$), nitrogen trioxide ($N_2O_3$), nitrogen tetroxide ($N_2O_4$) and nitrogen pentoxide ($N_2O_5$); an inorganic non-acidic substituted oxy-nitrogen compound such as a nitrosyl halide, for example, nitrosyl fluoride, nitrosyl chloride and nitrosyl bromide; an inorganic nitrosyl complex compound, for example, nitrosyl, perchlorate, nitrosyl fluoroborate, nitrosyl pyrosulfate, nitrosyl sulfate, nitrosyl selenate; an inorganic nitroxyl halide, for example, nitroxyl chloride, nitroxyl fluoride and any mixture of the above mentioned compounds. It is to be understood that compounds which yield an inorganic, non-acidic, oxy-nitrogen compound in situ may be employed as a sole source of coreactant or may be used in combination with any of the above mentioned inorganic, oxy-nitrogen compounds without departing from the scope of this invention.

The preferred addition agent used in accordance with the present invention are the nitrosyl halides and oxide of nitrogen, namely, nitric oxide and its dimer, nitrous peroxide and nitrogen dioxide and its dimer, nitrogen tetroxide.

The concentration of the quinodimethane and oxy-nitrogen compound may vary over a relatively wide range without departing from the scope of this invention. For example, the novel oxy-nitrogen containing polymer of this invention may be obtained by employing from about 1.0 mole to about 25 moles or higher of the oxy-nitrogen compound per mole of quinodimethane. Of the novel polymers produced in accordance with this invention, those containing at least 0.2 percent by weight of nitrogen are preferred. In order to obtain these preferred polymers, the mole ratio of oxy-nitrogen compound to quinodimethane is at least 1:1 and is preferably at least 2:1. It is particularly preferred to employ a relatively high concentration of the addition agent with respect to the quinodimethane, i.e. from about 2 moles to about 15 moles or more of the addition agent per mole of quinodimethane. The use of more than about a 25 molar excess, however, is generally unnecessary in order to obtain a polymer having a substantial nitrogen content.

The process of the present invention may be carried out in the presence or absence of a catalyst without departing from the scope of this invention. Generally, any peroxy type polymerization catalyst which is effective under the reaction conditions employed herein, may be used if desired. Typical examples of suitable peroxy compounds which may be employed are trichloroacetic peroxide, difluoroacetic peroxide and the like. When a catalyst is used, it is preferably employed in an amount of between about 0.0001 and about 0.01 mole per mole of quinodimethane.

The quinodimethane and the oxy-nitrogen compound are usually interacted at a temperature below 30° C., which temperature may be as low as −120° C. The preferred upper temperature limit is −10° C. As indicated above, the quinodimethanes used as the monomer in the process of this invention tend to homopolymerize rapidly at temperatures above −45° C. even in the absence of a polymerization initiator. Thus, it is particularly preferred to contact the quinodimethane and the oxy-nitrogen coreactant at a temperature between about −80° C. and about −45° C., inasmuch as the competing homopolymerization reaction is to be kept at a minimum. It is particularly important that at least an equal molar amount of the addition agent be used when operating at temperatures above −45° C. Thus, for example when p-xylene is pyrolyzed under the aforesaid method the hot vapors of 1,4-quinodimethane are quenched quickly at a temperature between about −45° C. and about 30° C.; 1,4-quinodimethane is brought into contact with at least an equal molar amount of the oxy-nitrogen compound and the quenching, polymerization and addition steps are carried out substantially simultaneously.

The process of the present invention may be conducted in the vapor or in the liquid phase under either adiabatic or isothermal conditions without departing from the scope of this invention. It has been found that the process is more easily controlled, more convenient to operate and that a more uniform polymer is obtained by interacting the quinodimethane and the oxy-nitrogen coreactant in solution in a suitable liquid medium and that an optimum yield of the desired product is obtained when intimate contact is maintained between the reactants. Any of the above mentioned liquids which are used for quenching of the hot quinodimethane vapor also may be employed as a mutual solvent in which polymerization is effected. However, a liquid medium provided by mixture of solvents may also be used without departing from the scope of this invention.

Although the order of addition of the reactants to the reaction zone may vary, it is preferred to add the solution of quinodimethane to the oxy-nitrogen coreactant which may or may not be in solution if lower molecular weight polymers are desired. Thus, for example, a solution of quinodimethane may be added to a solution of the inorganic coreactant in a mutual solvent preferably while agitating the reaction mixture in order to promote better contact between the reactants and to prevent localized overheating and the build-up of a high concentration of the quinodimethane at the site of addition. It is within the scope of this invention, however, to employ the oxy-nitrogen compound dissolved in a solvent which is different from, but miscible with the quinodimethane solvent. Solvents which are particularly suited for the oxy-nitrogen compound are acetone, methyl ether, methyl alcohol, dioxane, methyl ethyl ketone, hexane and the like.

By proper choice of a combination of solvents it is possible to carry out the polymerization under conditions such that the quinodimethane solvent is continuously distilled from the reaction zone, thereby making it possible to add relatively large amounts of quinodimethane without a large dilution effect. According to this procedure, the oxy-nitrogen compound is dissolved in a relatively high boiling solvent such as chlorobenzene and the quinodimethane is dissolved in a lower boiling solvent such as acetone. The quinodimethane solution is maintained at a temperature of about −80° C., for example, and is added to the acetone solution of the coreactant which may be at a temperature as high as about 30° C. or higher but insufficiently high to effect an overall increase of reaction temperature above 30° C. As the cold solution of quinodimethane is added to the warmer coreactant solution, the quinodimethane solvent is vaporized and withdrawn from the reaction zone. This provides an efficient way of carrying out the process of this invention to produce high yields of oxy-nitrogen-containing polymers over a wide range of reaction temperature particularly at temperatures above −45° C.

The process of this invention also may be carried out by contacting the solution of quinodimethane with gaseous inorganic coreactant under conditions such that intimate contact between the two reactants is realized. The latter procedure may be effected by spraying the solution of quinodimethane as a mist into a vapor filled with gaseous coreactant, or by bubbling the gaseous coreactant through a porous ceramic disk immersed in a quinodimethane solution at a rate sufficient to convert the quinodimethane solution to a bed of tiny bubbles of oxy-nitrogen compound.

As indicated above, agitation of the reaction mixture is helpful in promoting better contact between the monomers and is particularly recommended when it is desirable to produce maximum amounts of low molecular weight polymeric products. Agitation may be achieved by mechanical stirring using a reciprocating blade or propeller, by shaking the reaction vessel, by the bubbling action of the coreactant and by any other known conventional method. Generally, the polymerization of quinodimethane in the presence of the oxy-nitrogen coreactant is carried out at atmospheric pressure although higher and lower pressures may be employed without departing from the scope of this invention. Thus, for example, the reaction zone may be pressure with nitric oxide up to about 1000 pounds per square inch gauge since nitric oxide is slightly less soluble than nitrogen dioxide. The use of higher pressures may be used to special advantage whenever the gaseous oxy-nitrogen coreactant is added to a quinodimethane solution wherein the coreactant is not sufficiently soluble.

The overall reaction period of the polymerization may vary over relatively wide limits such as between about 1 minute and about 100 hours, but usually between about 0.5 hour and about 24 hours. The novel polymer product begins to form as soon as the two reactants are contacted, however, substantial quantities are not collected until after about 0.5 hour has expired. The rate of reaction is partly dependent on the reaction temperature. Thus, the temperatures within the upper portion of the above range, for example from about −10° C. to about 30° C., the rate of polymerization is faster than at temperatures within the lower portion of the range.

It should be apparent to those skilled in the art from the above discussion that the process of this invention is readily adapted to batch-wise or continuous operation by modifications in equipment. The polymerization reaction of this invention is carried out under conditions set forth above by reacting the quinodimethane and inorganic oxy-nitrogen compound in an open or closed reactor, in the presence or absence of a promoter. The reaction vessel may be composed of glass, metal such as stainless steel, or any other suitable material such as a plastic, a ceramic, etc., and may be constructed as a bomb, an open reaction flask or a reactor which is equipped with a continuous feed and product takeoff for removal of polymer as soon as it is formed in the reaction zone. The crude polymer product is removed by any convenient method such as, for example, by fractionation if the product is a liquid, or by filtration if the product is a solid. The crude product is then purified by leaching with dilute base and acidifying, by washing, filtering and drying or by any other suitable method of purification. The structure and composition of the aromatically unsaturated oxy-nitrogen-containing compound is determined by percent composition analysis and infrared analysis.

As indicated above, the reaction between the inorganic oxy-nitrogen addition agent and the quinodimethane is a polymerization reaction and leads to the production of a novel oxy-nitrogen-containing polymer having at least one terminal oxy-nitrogen radical and a recurring monomer unit which comprises an aromatically unsaturated nucleus to which two substituted or unsubstituted methylene groups are each singly bonded.

The linking of quinodimethane units to form a chain and the terminal addition of the oxy-nitrogen radical to a methylene group of a quinodimethane unit converts the quinoid ring of said quinodimethane to an aromatically unsaturated ring.

The aromatically unsaturated nucleus and the methylene groups bonded thereto contain such substitution as is present in the quinodimethane starting material so that if 1,4-quinodimethane were reacted with a substituted or nonsubstituted oxide of nitrogen the recurring monomer unit of the product would be 1,4-xylylene radical

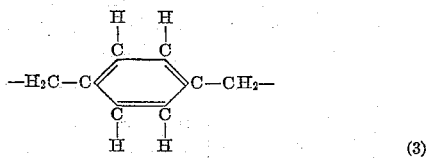

whereas if 3-chloro-1,4-quinodimethane were reacted with an oxide of nitrogen the recurring monomer unit of the product would be a 3-chloro-1,4-xylylene radical

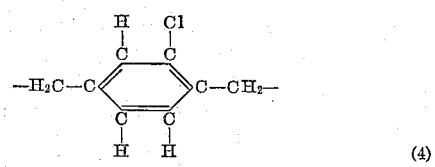

if 1,4-naphthaquinodimethane were employed in the reaction the resulting recurring monomer unit of the product would be a 1,4-naphthaxylylene radical

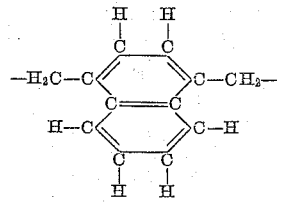

and if a heterocyclic quinodimethane containing a heteronitrogen atom vicinal to two carbon atoms were employed in the reaction of the resulting recurring monomer unit of the product would be an aromatically unsaturated ring singly bonded to two methylene groups and containing the heteronitrogen atom in the same position as in the quinoid ring of the quinodimethane starting material.

The polymeric products of this invention correspond to the following general formula $$A(-Y_2C-Q-CY_2-)_nB \qquad (6)$$

wherein A is an oxy-nitrogen radical selected from the group consisting of monoxy-nitrogen (NO), dioxy-nitrogen ($NO_2$) and trioxy-nitrogen ($NO_3$) radicals; B is selected from the group consisting of monoxy-nitrogen, dioxy-nitrogen, trioxy-nitrogen, a normally gaseous halogen such as, for example a fluorine, chlorine or bromine atom, and complex adducts of the nitrosyl complex compounds such as the perchlorate, fluoroborate, pyrosulfate, sulfate, selenate radicals; n is an integer from 2 to 1,000; Y is a hydrogen or halogen atom or a methyl group, however, it is to be understood that, although the Y units of the $CY_2$ group are the same or different units, only one Y unit can be a substituent other than a hydrogen atom; Q is an aromatically unsaturated nucleus of the benzene, naphthalene or heterocyclic nitrogen type which contains not more than two substituents selected from the group consisting of fluorine, chlorine and bromine atoms and halogenated and nonhalogenated methyl groups.

The preferred polymers of this invention contain at least one terminal oxy-nitrogen group and a plurality of aromatically unsaturated nuclei each of which is snugly bonded to two unsubstituted methylene groups in the 1 and 4 position of the nucleus. The preferred products of this invention correspond to the formula

wherein A and B are the same as A and B described above, n is an integer from 2 to 100 and the nucleus, designated as

contains such substitution as is present in the quinoid ring of the quinodimethane starting material.

The following examples are offered as a better understanding of the present invention and are not to be construed as unnecessarily limiting to the scope of the present invention.

EXAMPLE 1

This example illustrates the preparation of 1,4-quinodimethane.

p-Xylene vapor at 5 mm. mercury pressure and preheated to 700° C. was passed through a glass pyrolysis tube of 2.5 cm. diameter and 30 cm. in length at such a velocity that the average contact time was 0.05 second and heated to a pyrolysis temperature of 1000° C. The pyrolyzed vapors were passed directly to the top of a six liter, three-necked glass flask which contained 3.8 liters of a chloroform-carbon tetrachloride mixture (1:1 by volume) and were then cooled in a bath of solid carbon dioxide-acetone to a temperature of −80° C. The chloroform-carbon tetrachloride mixture was continuously agitated to prevent localized heating. The liquid remained transparent for about two hours until the saturation limit was reached and then became opaque as solid p-xylene precipitated out. The flask was disconnected from the train at the end of the run and the solid precipitate containing p-xylene was removed by filtration.

To prove that the mother liquor contained 1,4-quinodimethane, a portion of it was added at −80° C. to a solution of chloroform-carbon tetrachloride containing an excess of iodine. The mixture was allowed to warm to room temperature with occasional shaking but did not change in appearance. The excess iodine was neutralized with aqueous sodium thiosulfate and the organic liquid was washed with water to remove all traces of inorganic solids. The chloroform and carbon tetrachloride was removed under vacuum and the dry residue was recrystallized from methanol to give a light brown crystalline compound having a melting point of 176°–177° C. and 70.9 percent iodine. This corresponds to the reported melting point for 1,4-di-iodomethylbenzene, namely, 177°–178° C.

The remainder of the mother liquor containing 1,4-quinodimethane was stored at a temperature of −80° C. until it was desired to react it with an inorganic oxy-nitrogen compound to form the aromatically unsaturated oxy-nitrogen-containing polymers of the present invention. 1,4-quinodimethane is similarly prepared in acetone, hexane, toluene and any of the other liquids suitable for quenching of the pyrolyzed vapor; and other quinodimethanes previously discussed, such as, for example, 3-chloro-1,4-quinodimethane; 2-methyl-1,4-quinodimethane; 2,3-dichloro-1,4-quinodimethane; 1,4-naphthaquinodimethane; 5-chloro-1,2-quinodimethane; etc., may be similarly prepared without departing from the scope of this invention by pyrolyzing the corresponding xylene derivative under the conditions set forth above.

EXAMPLE 2

*Formation of Dioximes of 1,4-Quinodimethane*

In a five liter glass, round-bottomed, Erlenmeyer flask, gaseous nitric oxide was bubbled through a liter of methanol for 30 minutes at −80° C. Two liters of 1,4-quinodimethane (0.5 mole) dissolved in methanol was then added. The bubbling of nitric oxide through the solution was continued for two hours during which time the mixture was allowed to warm to room temperature. The system was then flushed with liquid nitrogen and the insoluble polymeric material (1.2 grams) was removed by filtration. The mother liquor was evaporated to dryness to yield five grams of product containing 7.97 percent nitrogen which was soluble in dilute aqueous sodium hydroxide. The product can be hydrolyzed to the aldehyde (terephthalaldioxime) which is useful as a sizing agent and as a cross-linking agent for many organic polymers such as, for example, polyvinylalcohol.

EXAMPLE 3

*Reaction of 1,4-Quinodimethane With Nitrogen Dioxide*

To a large excess (1 mole) of nitrogen dioxide gas which was condensed into a three-necked flask containing 500 ccs. hexane at −80° C. was added, with vigorous stirring, 0.1 mole of 1,4-quinodimethane monomer in 1.5 liters of hexane. Precipitation occurred instantly on warming to room temperature. The insoluble material was removed by filtration. The product was leached with hot methanol and the insoluble residue was removed by filtration (percent N=2.35). The methanol solution was cooled to −80° C. and the material which precipitated from solution was removed by filtration (percent N=3.03). The mother liquor was evaporated to dryness leaving a residue which contained 5.11 percent N. Each of the three flasks contained a mixture of nitro, nitroso, nitrite and nitrate compounds which have an average ratio of moles p-xylylene unit to 2(NO$_2$) of 10.6, 7.0 and 4.3 respectively. The product softened at about 120° C.

EXAMPLE 4

*Reaction of 1,4-Quinodimethane With Nitrosyl Chloride*

A clear solution of chloroform-carbon tetrachloride (3.8 liters) containing 16 grams of 1,4-quinodimethane was added at −78° C. to 500 ccs. of chloroform-carbon tetrachloride solution containing 25.1 grams of nitrosyl chloride. The resultant solution was allowed to warm up to room temperature and the solid precipitate (8 grams) was removed by filtration. The solid was dissolved in toluene and the solution was diluted with hexane to cause a portion of the solute to precipitate. The solid (1.5 grams) was removed by filtration after sublimation and recrystallization from hot hexane. The product melted at between 45 and 46° C. The analytical results were as follows: 4.18 percent H, 63.2 percent C, 23.30 percent Cl, 4.67 percent N which corresponded to an empirical formula of $C_{16}H_{13}NOCl_2$.

The hexane-toluene solution was then concentrated to a fraction of its volume and upon chilling crystals were formed (1 gram) which on recrystallization from hexane melted at 101.5° C. to 102.5° C. The analytical results were as follows: 4.35 percent H, 56.98 percent C, 20.76 percent Cl, 8.18 percent N which corresponds to an empirical formula of $C_8H_8NOCl$.

EXAMPLE 5

The product of Example #2 is dissolved in benzene and sprayed onto object to be coated. Object baked at 75° C. in an atmosphere of benzene to produce a product having a smooth coherent protective coating.

EXAMPLE 6

Poly-p-xylylene has been found to be unsuitable in some applications due to its characteristic embrittlement. This example illustrates the application of the oximes of this invention as plasticizers for poly-p-xylylene.

1,4-xylylene is pyrolyzed and the resulting 1,4-quinodimethane is dissolved in a solvent mixture of chloroform and carbon tetrachloride as an Example #1. The quinodimethane is allowed to polymerize at 30° C. and the resulting polymer is admixed with about ten percent by weight (based on quinodimethane) of poly-p-xylylene dioxime (product of Example #2). The resulting polymer is a thermoplastic which shows a marked increase in flexibility over the homopolymer thus making the plasticized polymer suitable as a protective coating for various articles such as wire and cable which would otherwise be excluded from the field of application of the unplasticized homopolymer. The plasticized polymer can also be molded into a variety of useful articles, such as O-rings, diaphragms, etc.

EXAMPLE 7

In a five liter glass flask containing six moles of nitrosyl sulfate is added with stirring one mole of 1,4-quinodimethane dissolved in methanol at −50° C. The reaction is allowed to run for eight hours during which the reaction mixture is constantly agitated. After the reaction is complete the product

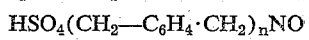

wherein *n* is an integer from 20 to 50 is separated.

EXAMPLE 8

A sample of the product obtained in Example #7 is pressed into an opaque white button at about 200° C. The button is rigid and possesses good resistance to abrasion.

Any of the other previously described addition agents can be reacted with a quinodimethane in a manner similar to that set forth above and may be substituted in any of the examples without departing from the scope of this invention.

The aromatically unsaturated, oxy-nitrogen-containing polymers of this invention are useful as plasticizers with various organic polymers such as, for example, poly-p-xylylene itself. The polymers have good molding properties which permit them to be pressed at temperatures between about 150° C. and about 250° C. into useful thermoplastic articles of manufacture such as O-rings, gaskets, diaphragms, etc., having good heat stability and electrical properties. The polymers can also be applied as protective coatings by the spray technique described herein to provide protective films having the above desirable properties. Polymer coated wires and cables exhibit a resistance to oxidation as well as resistance to abrasion and corrosion.

The oximes of this invention can be hydrolyzed to the corresponding aldehydes which are useful as sizing and cross-linking agents. They are also precursors for high molecular weight mono and polycarboxylic acids since oxime group readily undergoes oxidation to the carboxylic group.

The oxy-nitrogen-containing polymers of this invention may be applied as coating materials which are thermally pressed onto a substrate or they may be dissolved or dispersed in a volatile polar solvent such as methyl ethyl ketone, acetone, etc., and sprayed onto a wire, cable or, in general any metal, wood, glass or plastic surface.

This invention relates to a process for the preparation of aromatically unsaturated oxy-nitrogen-containing polymers which involves the polymerization of a chilled solution of 1,4-quinodimethane in the presence of an inorganic, non-acidic, oxy-nitrogen addition agent at a temperature most preferably below —45° C. and to the products obtained thereby. The method for effecting the polmerization reaction may be any of the various procedures herein described, and various modifications and alternatives of these procedures may become apparent to those skilled in the art without departing from the scope of this invention.

Having thus described our invention we claim:

1. The polymer which comprises a plurality of xylylene units and at least one terminal oxide of nitrogen in which the nitrogen is bonded directly to the methylene group of the terminal xylylene unit radical.

2. The polymer which comprises a plurality of 1,4-xylylene units and at least one terminal oxide of nitrogen in which the nitrogen is bonded directly to the methylene group of the terminal xylylene unit radical.

3. The polymer which comprises a plurality of 1,4-naphtha-xylylene units and at least one terminal oxide of nitrogen in which the nitrogen is bonded directly to the methylene group of the terminal xylylene unit radical.

4. The polymer which comprises a plurality of 2-chloro-1,4-xylylene units and at least one terminal oxide of nitrogen in which the nitrogen is bonded directly to the methylene group of the terminal xylylene unit radical.

5. The polymer which comprises a plurality of heterocyclic xylylene units containing not more than two heteronitrogen atoms which are vicinal only to carbon atoms and at least one terminal oxide of nitrogen in which the nitrogen is bonded directly to the methylene group of the terminal xylylene unit radical.

6. The polymer which comprises a plurality of 2-methyl-1,4-xylylene units and at least one terminal oxide of nitrogen in which the nitrogen is bonded directly to the methylene group of the terminal xylylene unit radical.

7. The process which comprises polymerizing a quinodimethane in the presence of an inorganic, nitrogen compound selected from the group consisting of an oxide of nitrogen, a nitrosyl compound, a nitroxyl halide and mixtures of these compounds at a temperature below 30° C. to produce a polymer containing a terminal oxide of nitrogen in which the nitrogen is bonded directly to the terminal methylene group.

8. The process of claim 7 wherein the quinodimethane is 2-chloro-1,4-quinodimethane.

9. The process of claim 7 wherein the quinodimethane is a heterocyclic 1,4-quinodimethane containing not more than two heteronitrogen atoms which are vicinal only to carbon atoms.

10. The process of claim 7 wherein the quinodimethane is 2-methyl-1,4-quinodimethane.

11. The process which comprises polymerizing a quinodimethane in the presence of an oxide of nitrogen at a temperature below 30° C. to produce a polymer containing a terminal oxide of nitrogen bonded directly to a methylene group.

12. The process of claim 11 wherein the oxide of nitrogen is nitric oxide.

13. The process of claim 11 wherein the oxide of nitrogen is nitrogen dioxide.

14. The process of claim 11 wherein the oxide of nitrogen is nitrogen pentoxide.

15. The process which comprises polymerizing a quinodimethane in the presence of at least an equivalent amount of a nitrosyl compound at a temperature between about —120° C. and about —10° C. for a period not exceeding 100 hours to produce an aromatically unsaturated oxime.

16. The process of claim 15 wherein the nitrosyl compound is nitrosyl chloride.

17. The process of claim 15 wherein the nitrosyl compound is nitrosyl sulfate.

18. The process which comprises polymerizing a 1,4-quinodimethane in the presence of a compound selected from the group consisting of an oxide of nitrogen, a nitrosyl compound, a nitroxyl halide and mixtures of these compounds in a mutual solvent, in a mol ratio of between about 1:2 and about 1:15, at a temperature between about —80° C., and about —40° C., for a period of between about 0.5 hour and about 24 hours to produce a polymer containing a terminal oxide of nitrogen in which the nitrogen is bonded directly to the methylene group of the terminal xylylene unit.

19. The process of claim 18 wherein the mutual solvent is hexane.

20. The process of claim 18 wherein the mutual solvent is methanol.

21. The process of claim 18 wherein the mutual solvent is chlorobenzene.

22. The process of claim 18 wherein the mutual solvent is diethylbenzene.

23. The process of claim 18 wherein the mutual solvent is carbon tetrachloride.

References Cited in the file of this patent

UNITED STATES PATENTS

| | | |
|---|---|---|
| 2,485,277 | Gilbert | Oct. 18, 1949 |
| 2,537,015 | Barrett | Jan. 9, 1951 |
| 2,537,309 | Kropa et al. | Jan. 9, 1951 |
| 2,603,629 | Bloch | July 15, 1952 |
| 2,719,131 | Hall | Sept. 27, 1955 |
| 2,726,217 | Hubbard | Dec. 6, 1955 |
| 2,756,239 | Anderson | July 24, 1956 |

OTHER REFERENCES

Szwarc: Journal of Polymer Science, vol. VI (1951), pp. 319–329.